United States Patent [19]

Weber et al.

[11] 3,956,533
[45] May 11, 1976

[54] METHOD OF APPLYING A SEALANT TO PARTS TO BE CONNECTED

[75] Inventors: Günter Weber; Reinhold Speck; Stefan Forberger, all of Singen, Germany; Josef Jusko, Schaffhausen, Switzerland

[73] Assignee: Georg Fischer Aktiengesellschaft, Schaffhausen, Switzerland

[22] Filed: Sept. 26, 1973

[21] Appl. No.: 400,916

[30] Foreign Application Priority Data

Sept. 29, 1972 Austria .............................. 8397/72
Mar. 29, 1973 Switzerland ....................... 4569/73

[52] U.S. Cl. .............................. 427/236; 118/408; 118/DIG. 10; 264/267; 427/230; 427/239; 427/355

[51] Int. Cl.² .............................................. B05D 7/22

[58] Field of Search ................. 117/97, 95; 285/55, 285/291, 355; 264/262, 267, 269; 425/113, 393, 469; 118/408, 105, DIG. 10; 401/9; 427/230, 236, 238, 239, 355

[56] References Cited
UNITED STATES PATENTS

| | | | |
|---|---|---|---|
| 2,656,857 | 10/1953 | Cavallier | 285/55 X |
| 2,760,585 | 8/1956 | Bergeron | 118/408 X |
| 2,767,417 | 10/1956 | Amen | 401/9 X |
| 2,810,145 | 10/1957 | Forrow | 401/9 X |
| 2,942,640 | 6/1960 | Lundeberg | 117/97 X |
| 3,074,810 | 1/1963 | Timson | 117/95 X |
| 3,101,207 | 8/1963 | Pavel et al. | 285/55 X |
| 3,290,199 | 12/1966 | Willhoite | 117/95 X |
| 3,339,003 | 8/1967 | Cessna | 264/262 |
| 3,355,533 | 11/1967 | Mistic | 264/267 |
| 3,492,381 | 1/1970 | Rhyne | 264/267 X |
| 3,687,493 | 8/1972 | Lock | 285/355 X |
| 3,817,210 | 6/1974 | Greever | 118/408 |
| 3,869,393 | 3/1975 | Booker | 285/355 X |

FOREIGN PATENTS OR APPLICATIONS

45-35198 11/1970 Japan ............................. 427/238

*Primary Examiner*—Harry J. Gwinnell
*Assistant Examiner*—Stuart D. Frenkel
*Attorney, Agent, or Firm*—Browdy and Neimark

[57] ABSTRACT

Liquid sealant is applied to threaded parts that are to be connected by screwing or fitting together in a gas- or liquid-tight manner in a uniformly thick coating and the coating allowed to harden, so that the parts may be stored indefinitely before use. The coating is applied by an application tool which has a similar threaded shape to the part to which the coating is to be applied and which is provided with outflow openings in its surface.

7 Claims, 12 Drawing Figures

METHOD OF APPLYING A SEALANT TO PARTS TO BE CONNECTED

FIELD OF THE INVENTION

The present invention concerns a method for applying a sealant to parts which are to be connected in a gas- and liquid-tight manner by screwing or pushing them together, as well as apparatus for accomplishing the method.

BACKGROUND OF THE INVENTION

It is known, especially in the case of parts which are screwed together, such as valves, fittings, pipe sections and the like, to apply a liquid sealant to the appropriate threaded sections before screwing them together, and then screwing the parts together. The result is a chemical binding of the sealant, e.g. in the presence of iron or copper or exclusion of $O_2$ (e.g., Loctite). In this method of producing tight connections, however, the plumber is advised to apply the sealant on the job (for example, in liquid form) to the corresponding parts; this is time-consuming, and expensive and unacceptable as far as tightness is concerned. Sealing on the job by means of hemp, PTFE tape and the like can also be mentioned as known.

SUMMARY OF THE INVENTION

The present invention teaches the use of a method for applying a sealant which makes it possible to make finished parts that can be taken from stock and screwed or otherwise put together on the job so that they are gas- and liquid-tight without additional measures being necessary, such as the application of a sealant or other sealing means.

The stated problem is solved by a method which is characterized by the fact that the liquid sealant is applied to at least one of the parts, then spread with a wiper to produce an at least approximately uniformly thick coating with overforming of the surface of the part, and that this coating is then allowed to harden.

BRIEF DESCRIPTION OF THE DRAWING

The invention is described in further detail in the drawings and sample embodiments.

DESCRIPTION OF PREFERRED EMBODIMENTS

Figure 1:
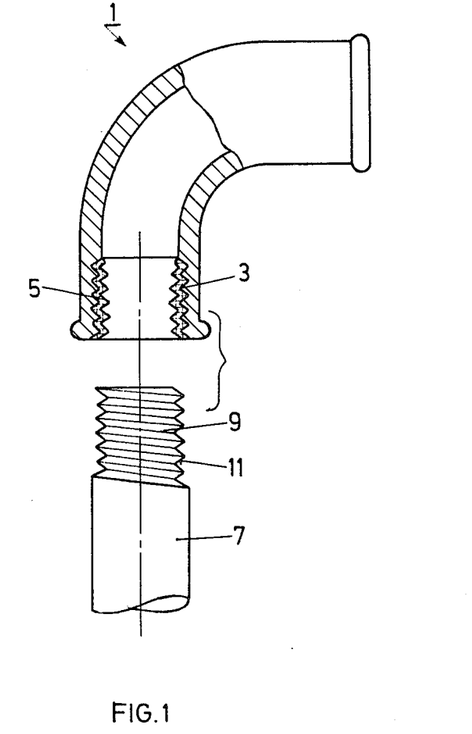
FIG. 1: A view of two parts, in the form of a pipe end and a partially cut away elbow fitting, to be joined together in a gas- or liquid-tight manner by screwing.

FIG. 1 shows, prior to screwing them together, an elbow fitting 1 with an internal thread 3, to which a solid sealant 5 made of synthetic resin has been applied. This coating of sealant, depending on the size of part 1, has a thickness of (for example) between 2 and 1,000 microns, usually betweeen 100 and 300 microns, and is practically uniformly thick overall, with the extent of the sealant layer being limited largely to the surface of the threads 3.

The ratio of the layer thicknesses to the diameter of the part to be covered is normally less than 1:20 and usually is approximately 1:100.

In addition, a pipe end 7 with a conical threaded end 9 having an external thread 11 is shown. These two parts 1 and 7 can be screwed together to be gas-tight and naturally liquid-tight as well, without any additional sealing process being necessary. Conical threaded end 9 is screwed into the layer of sealant 5 and tightened in the normal fashion which is conventional for such connections. Elbow fitting 1, to whose internal thread 3 sealant layer 5 was applied during the manufacture of the fitting, can be left in stock for years without the sealant layer 5 undergoing any kind of disadvantageous changes.

Figure 2:
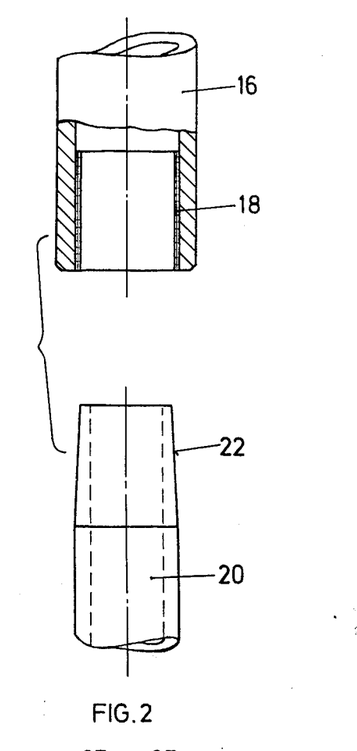
FIG. 2: Two pipe sections prior to being fitted together, partly cut away.

FIG. 2 shows a plug connection, prior to pushing the parts together, including an outer pipe 16 with an internal layer of solid sealant 18 made of synthetic resin and an inner pipe 20 with a conical end 22. The connection of the two parts 16 and 20, which are used in particular at low pressures, e.g., to carry drainage water, is accomplished by pushing the conical end 22 into the outer pipe 16, thus deforming the sealant layer 18 and connecting the two parts 16 and 20 so that they are gas- and liquid-tight. The sealant is preferably applied to only one part, as shown. It is also possible, however, to apply the sealant to both of the overlapping parts of the pieces that are to be joined.

Figure 3:
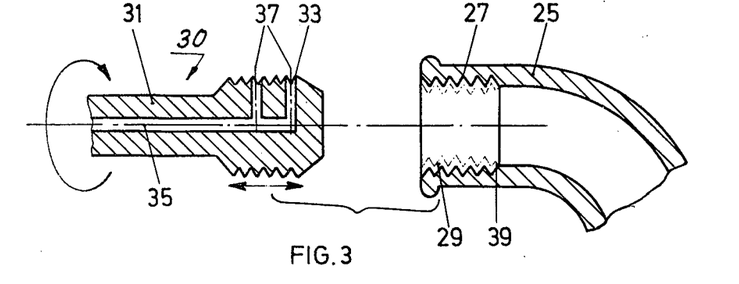
FIG. 3: A coating plug with a fitting, in a purely schematic representation.

A device like the one shown in purely schematic form in FIG. 3 is used to apply the sealant to an internal thread. FIG. 3 shows a portion of a lengthwise section through a fitting 25 which is provided at one end with an internal thread 27. Sealant 29 is indicated thereon. The latter is applied by means of a rotating plug 30 whose end has a thread 33 which matches the thread 27 of the fitting, the thread of the plug extending over a portion of or all of the surface. The plug shaft 31 is provided with a lengthwise bore 35 for feeding the liquid sealant. The bore 35 branches into radial bores 37 through which the sealant can emerge.

To accomplish the coating process, the rotating plug 30 is screwed into fitting 25 in the direction indicated by the arrow and the substance is allowed to flow out. This fills the space between the thread 27 of the fitting and the thread 33 of the plug 30 with sealant 29. By unscrewing plug 30 the sealant, which is shown as a dotted line and labeled 39, is spread uniformly over the thread of the fitting 25.

It is also possible to provide a portion of one of the parts, e.g., the internal thread, with the coating of sealant without previously cutting a corresponding thread in this part. When the two parts are put together, the portion of the other part which is provided with an external thread cuts a matching thread in the coating of the sealant, like a tap. In this case, the synthetic coating effects not only the sealing but also the mechanical connection of the two parts.

Aside from the advantage that, as has already been mentioned, the sealant can be applied to the thread or parts to be connected during the fabrication of the fitting or the cutting of the thread and not during the assembly process, the connection can be broken again if necessary. In most cases, the connection remains tight even with repeated screwing and unscrewing. It is also possible to twist the two parts with respect to each other, for example through 45°, without causing any changes in the sealing effect. This is important during assembly. Also, the coating of sealant is not sticky and when stored under normal conditions, e.g., with the fittings piled on top of each other, will not stick to itself or to other parts, and will not be contaminated with dust particles, dirt, etc. Such connections also allow a considerable saving of time with respect to previous types during assembly and thereby effect a noticeable saving. It must be kept in mind that this sealant adheres as a solid coating made of synthetic resin to the parts that are fabricated.

Coatings prepared in this manner can be used to seal threaded connections, decrease the tolerance between threads and protect against corrosion. The hardened coatings are physiologically inert (they may be used for tap water pipes), resist solvents and exhibit a very high adhesion to the thread surfaces in addition to providing a non-sticky, smooth coating.

Sealants of this kind preferably contain either polyaminoamide and/or epoxy compounds and/or a phenoplast. The application of the above-described sealant to parts that are to be connected by screwing or insertion into one another in a gas- or liquid-tight manner is generally accomplished by applying the liquid sealant to one or both parts and spreading it with a blade to achieve an at least approximately equally thick coating overall. This coating is then allowed to harden so that (as stated above) it can be stored practically without any time limit, without any noticeable changes. It is possible to carry the sealant in the blade and allow it to flow out through holes in its surface so that the application of the sealant and its spreading can occur in direct sequence in a coordinated fashion.

In the case of threaded fittings or threaded pipe, a plug which rotates with respect to the workpiece is used as the spreader, this plug being provided at least partly with a surface that is threaded, and that the thread of the plug must match that of the fitting or tube, since the thread of the workpiece must be overformed as precisely as possible by the sealant. Instead of the plug, a disk can be used in the same fashion. After the workpiece has been coaated, the sealant is allowed to harden.

The rate of application along the circumference of the thread in such a method can be as much as 1.5 meters/ sec., preferably 0.3 to 0.6 m/sec., measured circumferentially around the fitting or the pipe.

The device shown in FIGS. 4 through 12 for coating the internal threads of fittings with a sealant is mounted on a base 101 and held by a wide adjusting spring 106 in slots 107 and 108. A bearing flange 110 is bolted to the rear end of a square bearing housing 103. Bearing housing 103 is provided with a bore 112 in which sliding ball housings 114 support a spindle sleeve 116. Sliding ball bearing housings 114 allow the spindle sleeve 116 to move back and forth in a friction-free manner in bearing housing 103. A shaft 118 is rotatably mounted in spindle shaft 116 by means of two front ball bearings 120 and 121 as well as a rear ball bearing 122. The rear, recessed end of the shaft 126 is fitted with a drive pulley 124, which is connected by means of cheese-head screw 131 with a drive pulley 129. Pulley 129 is in turn pressed onto the splined end 126 of shaft 118 and fastened to it. These keyed shafts and splines allow a non-rotating, axially displaceable connection. Drive pulley 129 is mounted on bearing flange 110 by means of two ball bearings 133. A bracket 135 is fastened to square base 103, said bracket serving to support a drive motor 147, whose free shaft end carries a drive pulley 148 that drives a toothed belt 149 that leads to drive pulley 124. A V-belt can also be used. A feed cylinder 137 is fastened to bearing housing 103. The front end 136 of a piston rod 139 activated by cylinder 137 is fastened by means of flange housing and a pulley by means of a nut to a yoke 141 which in turn is connected by cheese-head screw 133 to a front flange of stock sleeve 116. Yoke 141 is in turn fastened by cheese-head screws 145 to a rotary mount 152 thereby preventing rotary mount 152 from turning.

Figures 8, 12:
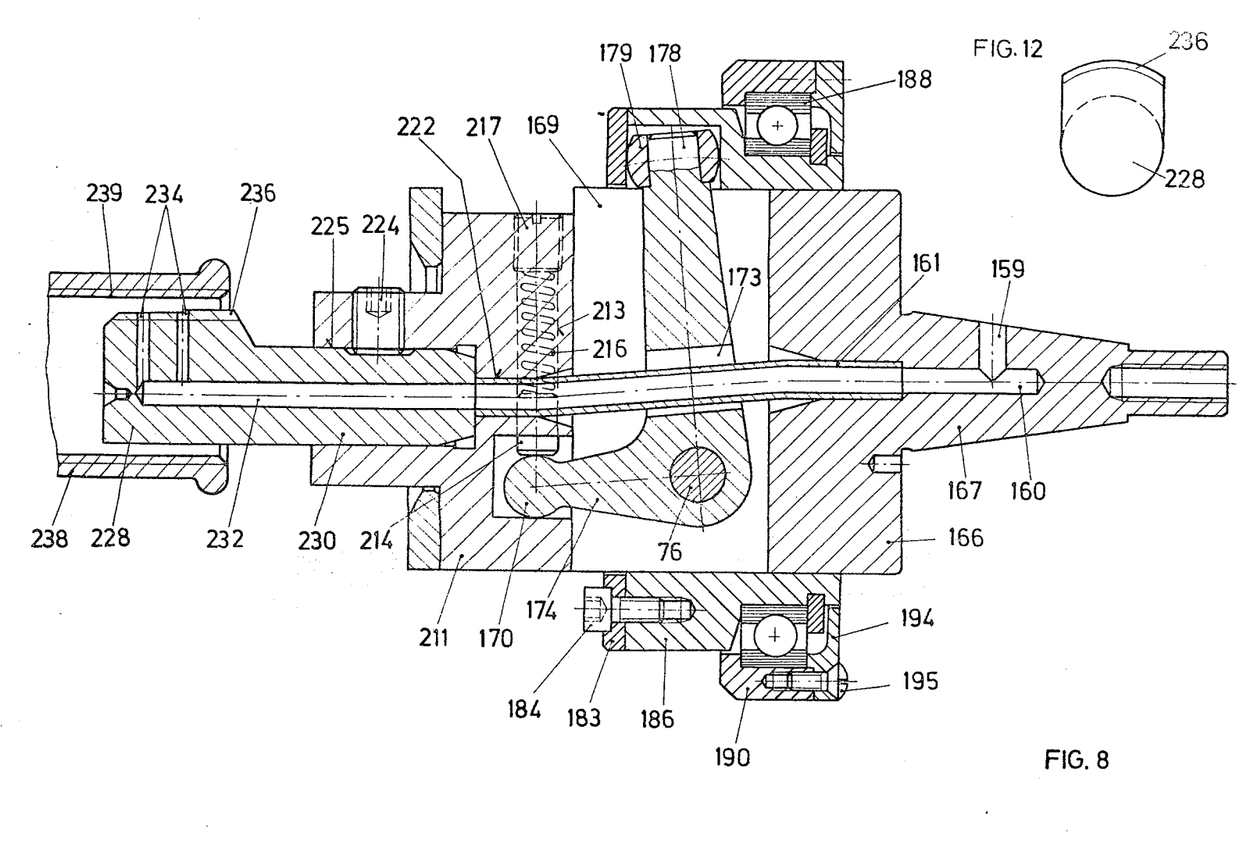
FIG. 8: A lengthwise section from the front part of the device according to FIG. 4.
FIG. 12: A front view of the coating tool.
Figure 9:
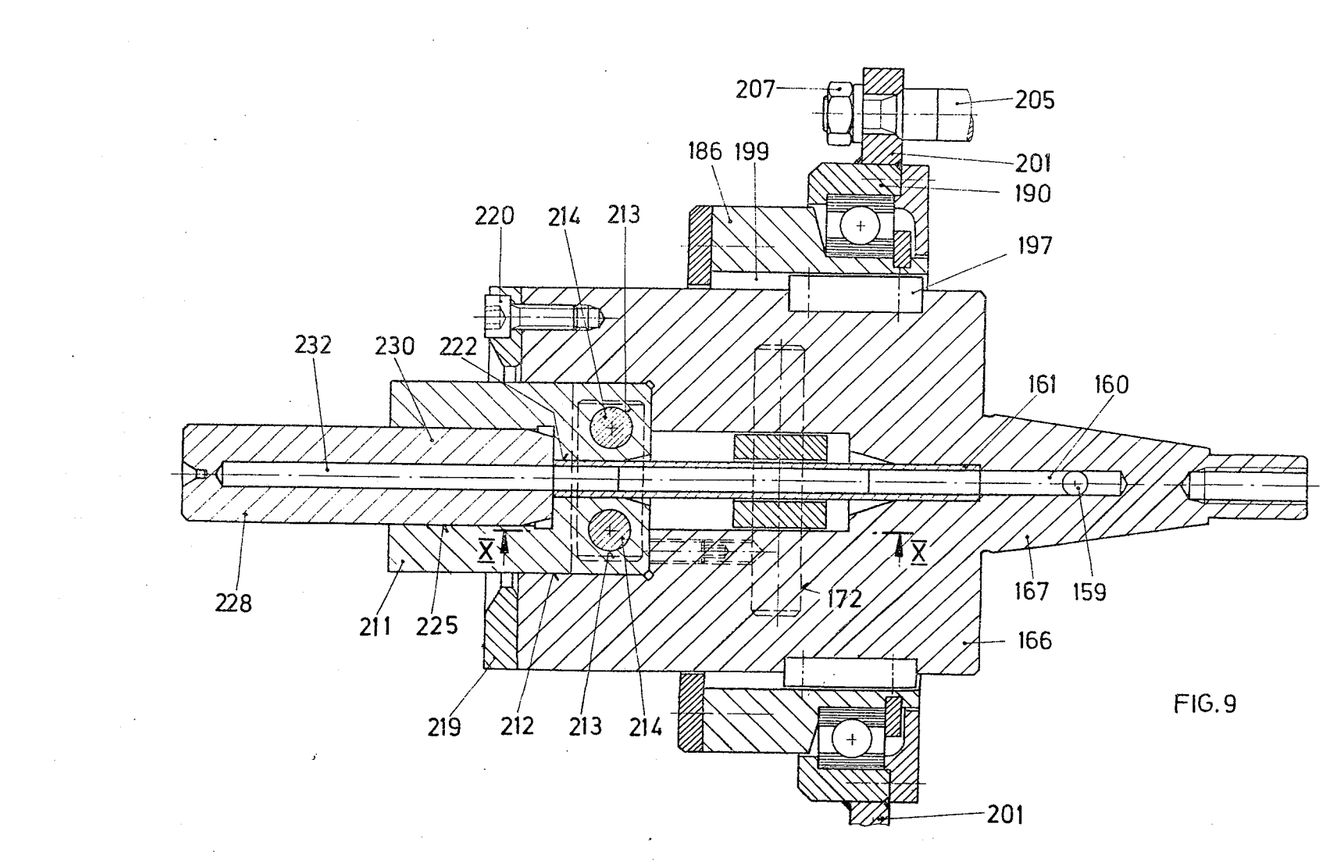
FIG. 9: A horizontal axial section through the front part of the device according to FIG. 8.
Figure 10:
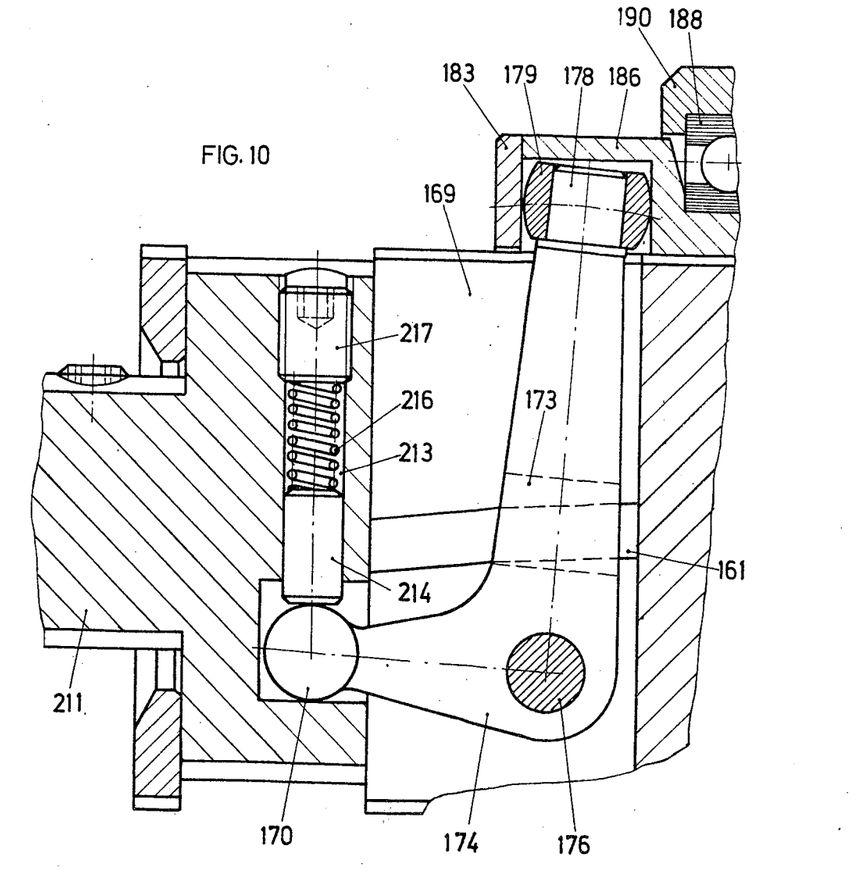
FIG. 10: A section from the front part along Line X—X in FIG. 9.

Rotary mount 152, mounted on shaft end 154 of shaft 118 is provided with a nipple 156 for connecting a sealant dispensing device (not shown). From this nipple 156 a radial bore 157 extends through rotary mount 152. It erminates in annular groove 158 which is connected to a radial bore 159 in the plug, which in turn merges with a central bore 160 in the shaft pivot. An adjustable head 166 is attached by means of a conical fitting 167 in shaft end 154 which is fastened by means of a connecting rod 168 which passes through the hollow shaft or spindle sleeve 116. Adjustable head 166, as can be seen from FIG. 8, is provided with a central cavity 169. A bent control lever 174 in cavity 169 is pivotally mounted in a depression 172 of adjustable head 166 on a pivot 176. The end of the lever 174 which projects from the adjustable head is made in the form of a cylindrical stub 178 provided with a ball bearing 179. The other end 170 of the control lever 174 is cylindrical.

Figure 4:
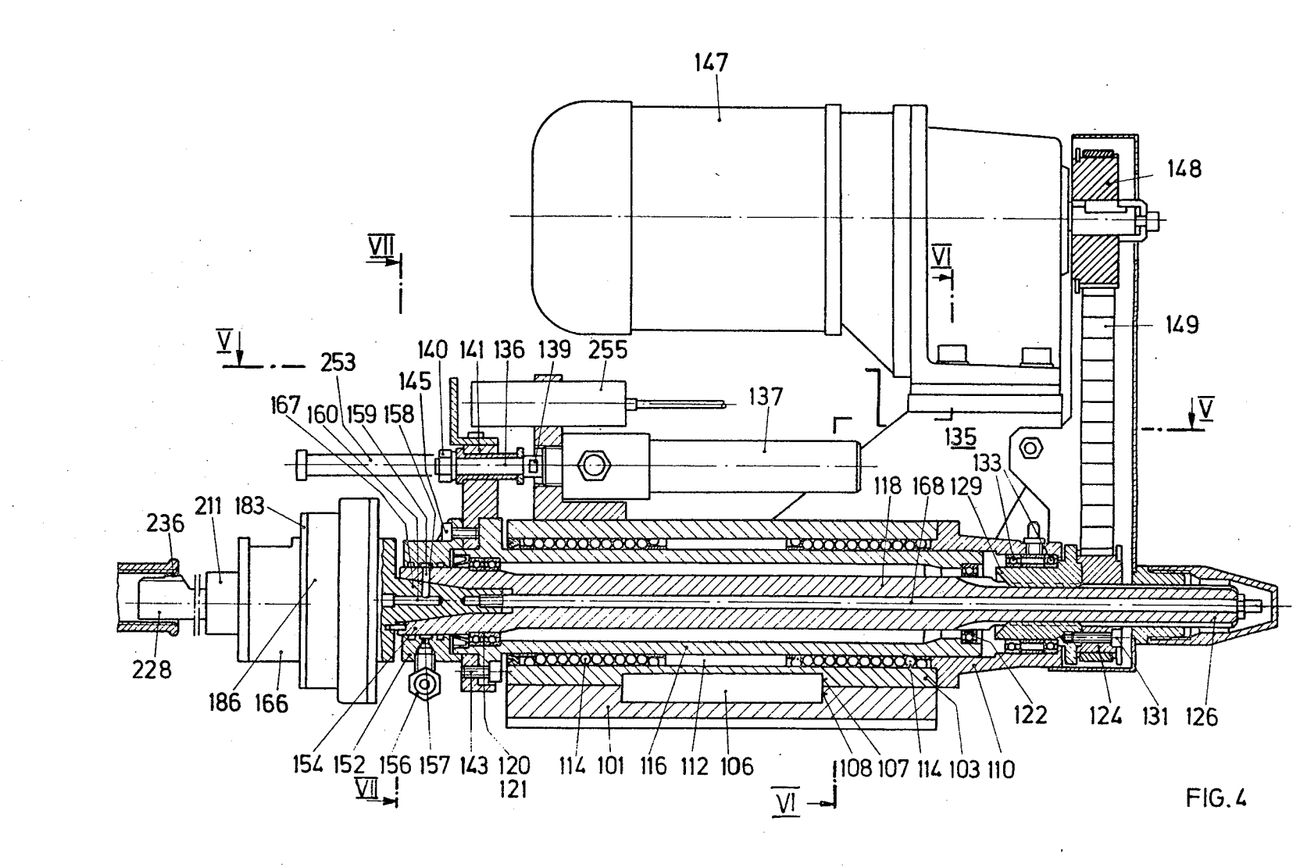
FIG. 4: A lengthwise section through a portion of a device for coating threads with top-mounted drive, shown in partial cross section.
Figure 5:
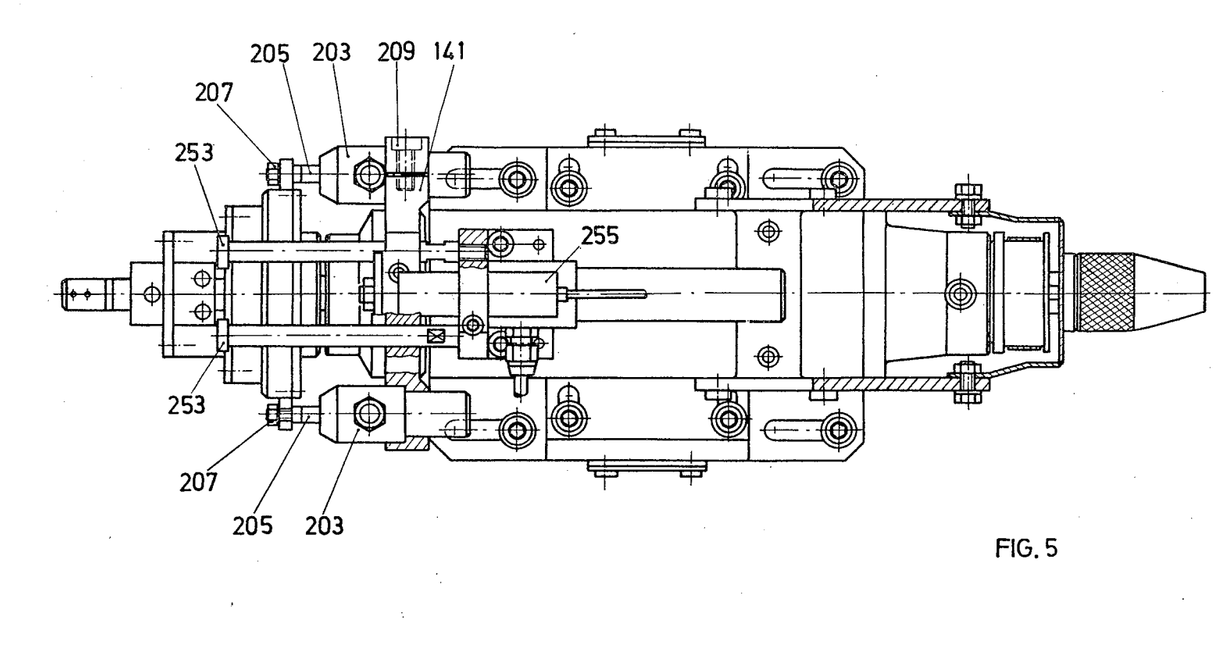
FIG. 5: A section along line V-V in FIG. 4.
Figure 6:
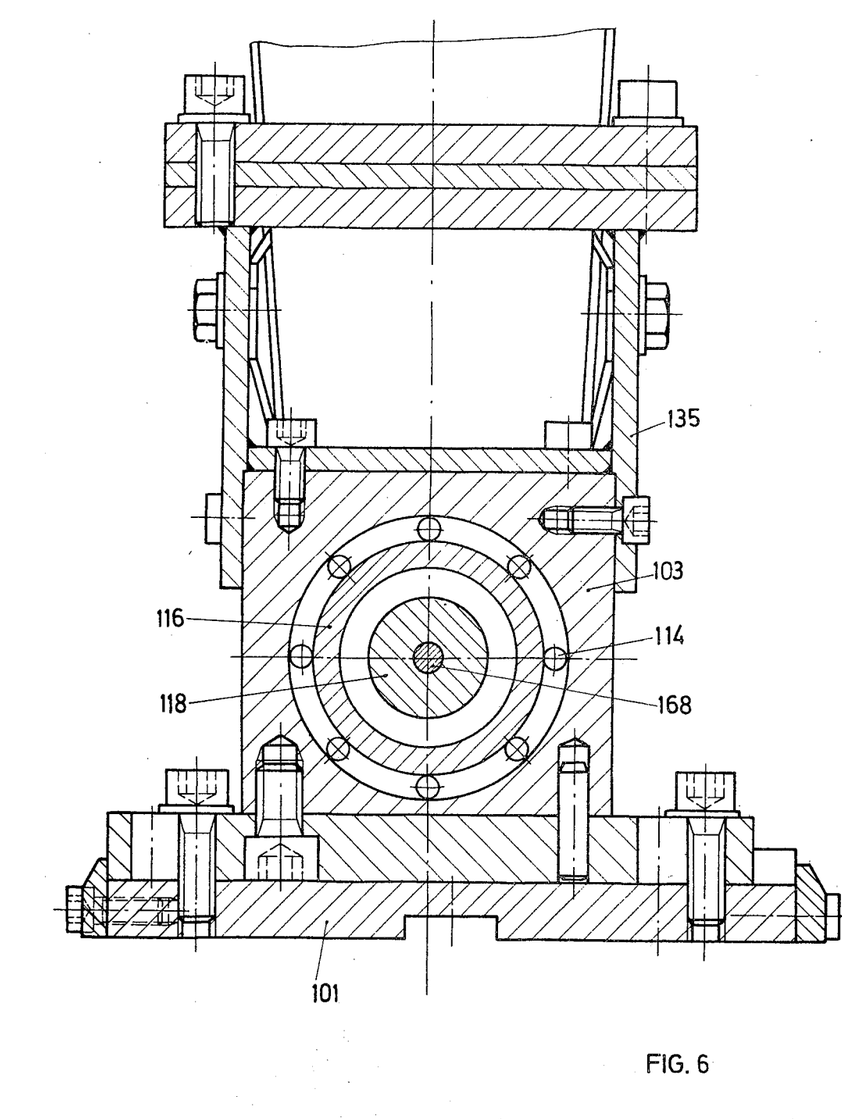
FIG. 6: A section through the device along line VI—VI in FIG. 4.
Figure 7:
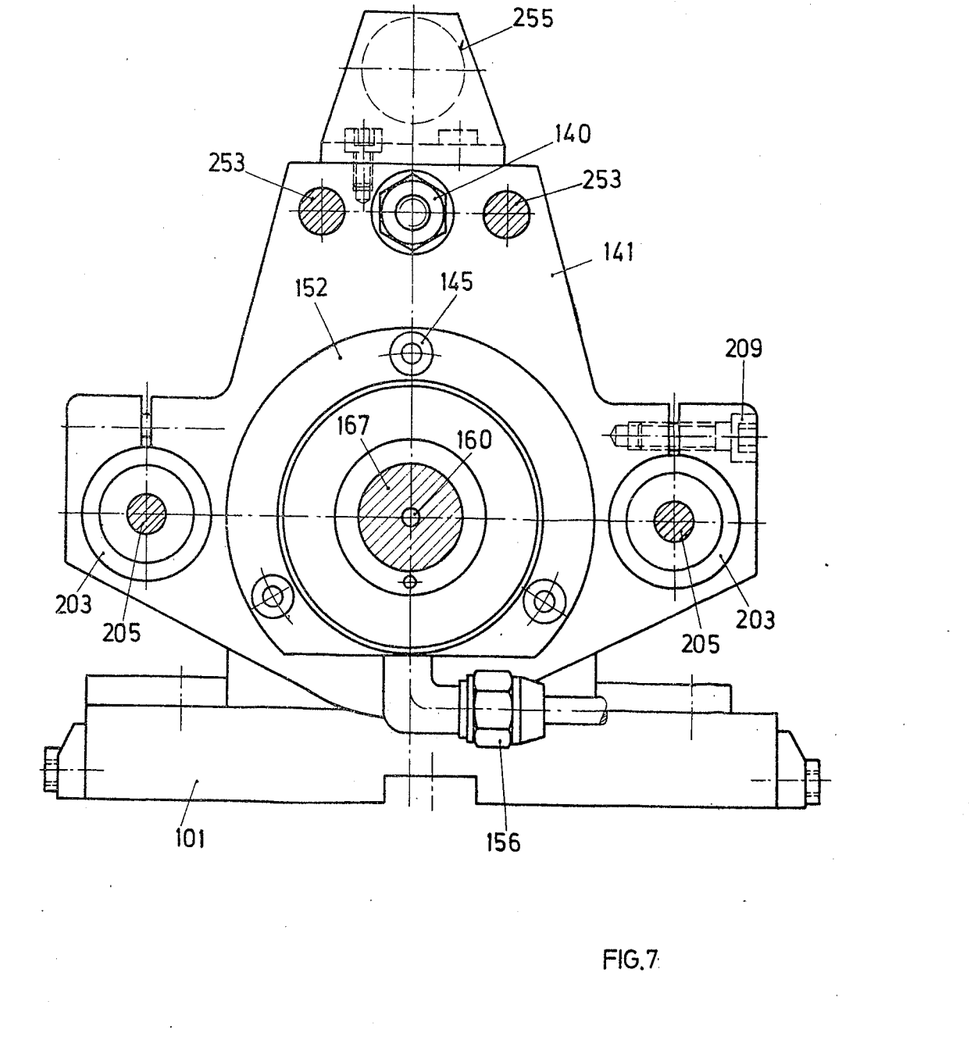
FIG. 7: A section through the device along the line VII—VII in FIG. 4.

In FIGS. 4 – 8, a ring 183 can be seen which is connected to a shift ring 186 by means of cheese-head screws 184. In a depression in shift 186 covered by ring 183 the ball bearing 179 of control lever 174 is inserted. Shift ring 186 has a ball bearing 188 whose outer race is fastened to the latter by means of a shift flange 190, and is covered with a cover 194 by countersunk screw 195. The cover covers the ball bearing mount 188. The connection between shift ring 186 and adjustable head 166 is accomplished (FIG. 9) by adjustable springs 197 mounted on adjustable head 166. These springs fit into grooves 199 in shift ring 186 and effect a non-rotating sliding connection between adjustable heaad 166 and shift ring 186. Lugs 201, mounted diametrically opposite to each other are welded to shift flange 190. Parallel to the lengthwise axis of the front assembly, there are two laterally mounted lifting cylinders 203, whose piston rods 205, made in the form of threaded bolts at the ends, are screwed into lugs 201 and held in place by nuts 207. Lifting cylinders 203 in turn are firmly fastened laterally to yoke 141 by means of cheese-head screws 209 as can be seen in FIG. 5.

A square base 211 is diagonally displaceably mounted in a depression 212 of adjustable head 166. A cover 219 fastened to adjustable head 166 by screws 220 holds support 211, with the internal diameter of the cover 219 selected so that it allows support 211 to shift within certain limits. For this purpose two bores 213 are provided in base 211 with a bolt 214 in each. These bolts 214 are pressed against the end of shift lever 170 by compression springs 216. Threaded rods 217 hold compression springs 216 as well as bolts 214 in bores 213. In addition, support 211, as a continuation of the shaft journal central bore 160, has a central bore 222 which passes through adjustable head 166.

The front end of central bore 160 is connected with bore 222 by means of a hose 161 which passes through an opening 173 in shift lever 174. This ensures a constant screw connection between the dispensing apparatus (not shown) and lateral bores 234 of a threaded plug 228. The hose connection then passes through the corresponding part of adjustable head 166.

Figure 11:
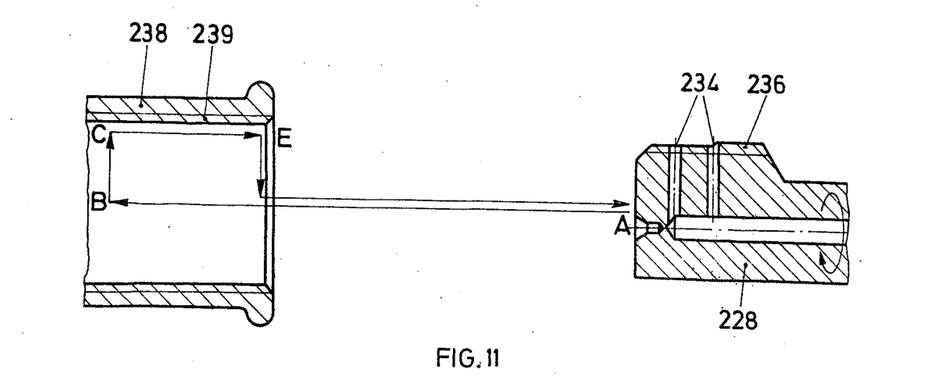
FIG. 11: A diagrammatic sketch of the process of movement according to the method for coating a fitting with an internal thread.

Base 211 is provided with a central bore 225 in which the threaded plug 228 is located. One end of the latter serves as a fastening plug 230 which is located in central bore 225 and held in place by a threaded rod 224. The threaded plug 228 is likewise provided with a bore 232 for conveying the sealant, which is not a through bore and terminates in the two lateral bores 234, as shown in FIG. 11.

Threaded plug 228 is provided on a portion of its circumference with threaded segment 236 in which a number of so-called guideways have been formed (FIG. 8). An end view of the threaded plug can be seen in FIG. 12.

Two stop pins 253 have also been provided in order to limit the depth of penetration of threaded plug 228 into the fitting, i.e., to limit its axial travel.

A corresponding non-contact limiting switch 255 is also provided to determine the end position of reverse travel.

FIG. 8 also shows one end of a fitting 238 with an internal thread 239, which was coated by means of the described apparatus in a manner which will be described below.

To coat the internal thread 239 of fitting 238, the latter was clamped in a device (not shown), for example, a chuck like those which are known in machines for cutting threads on fittings. The axis of the thread to be coated 239 is then mounted coaxially to the axis of rotation of shaft 118 or conical part 167. The A.C. pulley drive motor 147 drives pulley 124 by means of drive pulley 148 and toothed belt 149 thus driving shaft 118 through drive pulley 129. Shaft 118 rotates and with it adjustable head 166. In addition, shift ring 186, mounted on ball bearing 188, rotates with it, as does base 211 with cover 219 and threaded plug 228 fastened in support 211.

While this rotating system is rotating, feed cylinder 137 is charged with a compressed medium threaded plug 228 is inserted into fitting 238 which is to be coated, said feed cylinder pushing the piston in cylinder 137 and with it piston rod 139 forward. By means of yoke 141 and the flange of sleeve spindle 116, the latter slides on the ball bearings in thrust bearing 114 and moves forward into position B (FIG. 11), during which motion shaft 118 also brings with it all of the device which is located ahead of yoke 141. In this fashion, threaded plug 228 moves from a hold position A in an axial movement eccentrically with respect to fitting axis 237 and enters the interior of fitting 238 without meshing the threads of threaded plug 228 with the internal threads 239 of fitting 238, (FIG. 8 and position B, FIG. 11). After this movement, the piston is released in feed cylinder 137 so that threaded plug 228 is largely axially freely movable or unstressed.

Then the two lateral lifting cylinders 203 are charged with a compressed medium which flows into the anterior chambers of the cylinders and pushes the cylinders backward together with the lifting cylinder rods 205. In this manner, the shift flange 190 and with it the shift ring 186 are pushed backwards by lugs 201.

This takes with it ball bearing 179 with axle stub 178, so that shift lever 174 rotates about pivot 176. The shift lever end 170 then moves in a clockwise direction and by means of spring-loaded bolts 214 moves base 211 together with threaded plug 228 radially upward in chamber 212 (FIG. 8 and point C FIG. 11), i.e., the lengthwise axis of threaded plug 228 is meshed with that of internal thread 239.

The raised guide flanges of the threads of rotating threaded plug 228 mesh with the internal threads 239 of the fitting, so that the coating material comes from the lateral bores 234 in the dispensing device and enters internal threads 239 after being spread uniformly over several threads by rotating threaded plug 228. The projecting guide flanges of threaded plug 228 are spring-loaded in such a way (spring-loaded by springs 216, radial adjustment) in the threads of the fitting to be coated 239 and guided in such a way that a space of uniform width is formed between the lower threads of threaded plug 228 and the internal thread of fitting 239, with the sealant now being pressed in specified amounts into said space. By means of this radially spring-loaded feed, the threads can move smoothly while ensuring a good fit. Activated by the release of feed cylinder 137, the rotating part of the mechanism is pushed backwards as a function of the pitch of the threads and rpm of the threaded plug 228, with the process lasting sufficiently long that the threaded plug 228 with the rear opening of bore 238 comes in contact with the end of the internal thread 239 of fitting 238 (point E). At the appropriate time, threaded plug 228 is radially disengaged from the fitting threads by means of shift ring 186 and then pulled back by lifting cylinder 137 completely into the standby position, Point A (FIG. 11). Drive motor 147 continues to operate and threaded plug 228 with it. Now, e.g., by rotating the work table the coated fitting 238 is removed and another is put in its place, to be coated in the same fashion.

The following properties take place in the device itself: adjustable head 166 with threaded plug 228 is pushed axially by feed cylinder 137 until the head of the threaded plug 228 corresponds roughly approximately to the position of the internal threads of fitting 239 (FIG. 4).

The axis of the thread of threaded plug 228 during this process is in eccentric position with respect to the fitting axis and to the coaxial rotational axis of the device, so that there is no contact between fitting 238 and threaded plug 228.

In order to ensure that there is a connection between the swiveling shift lever 174 and its contact ends 181 and base 211 by means of spring mounted bolts 214, threaded plug 228 can be fitted into fitting 238 by radial displacement of the fixed internal thread 239 of fitting 238 so that even if the fitting and the device are not precisely centrally mounted a constant fit between threaded plug 228 and internal thread 239 is ensured.

By means of springs 216, axially parallel displacement between fitting 238 and threaded plug 228 it is assumed ensured that the sealant is applied uniformly over the entire circumference.

At the end of the coating process (Point E) the feed of the sealant from the dispensing apparatus stops. Cylinders 203 lose their pressure, threaded plug 228 is lifted radially by spring 216 from threaded fitting 239 and disengaged from the fitting threads by pressurizing feed cylinder 137 on the piston rod side in the eccentric position. This terminates one coating cycle (Point A). Motor 147 is preferably not shut off so that threaded plug 228 continues rotating in the same direction.

The above-mentioned cyclically repeated processes can be controlled advantageously by means of a programming device (Sequential control). By means of proximity switch 255, which corresponds to the standby position (Point A) of threaded plug 228, the step-by-step action of the above-mentioned work table with the fitting is controlled.

The same method and the same arrangement can be used for coating external threads as well, it being necessary only to modify the application tool (threaded plug) accordingly.

What is claimed is:

1. A method for applying a sealant to a screw threaded female part that is to be connected by screwing to a male part in a gas- or liquid-type manner, comprising moving a rotatable spreading tool, having a threaded shape on its outside surface which at least partially conforms to the threads on said female part, parallel to the axis of said female part from a resting position into an initial position within said female part, without effecting meshing of the threads;

radially adjusting the position of said spreading tool to effect meshing of threads of said spreader tool and said female part;

effecting a coaxial unscrewing motion of said spreading tool as said tool withdraws from the interior of said female part, while simultaneously applying said sealant in liquid form to the screw threads of said female part from openings in said rotating spreading tool by applying said liquid sealant between the threads of said tool and said female part, and simultaneously spreading said liquid sealant to a coating which is uniformly thick on said screw threads and shaping said coating be means of said spreading tool;

completely removing said spreading tool from the interior of said female part and returning said spreading tool axially and radially to its resting position; and then allowing the sealing coating to harden to a uniform thickness.

2. A method in accordance with claim 1 wherein said sealant is applied in a uniform coating to provide a final thickness between 2 and 1000 microns thick, the ratio of the coating thickness to diameter of said female part being less than 1:20.

3. Method according to claim 1, wherein the hardened layer is between 100 – 300 microns.

4. Method according to claim 1, wherein the sealant is applied with a maximum circumferential velocity of 1.5 m/sec.

5. Method according to claim 1, wherein the sealant is applied with a circumferential velocity of 0.3 to 0.6 m/sec.

6. A method in accordance with claim 1 wherein said spreading tool is moved radially immediately prior to its final withdrawal from said female part prior to returning said spreading tool axially to its resting position.

7. Method according to claim 1, wherein said spreading tool rotates during the entire motion cycle.

* * * * *